United States Patent [19] [11] 4,220,745
Tanaka et al. [45] Sep. 2, 1980

[54] PROCESS FOR POLYMERIZATION OF α-OLEFINS

[75] Inventors: Takao Tanaka; Tadashi Asanuma, both of Izumi; Tetsunosuke Shiomura, Takaishi; Akira Ito, Yokohama, all of Japan

[73] Assignee: Mitsui Toatsu Chemicals, Inc., Tokyo, Japan

[21] Appl. No.: 972,673

[22] Filed: Dec. 26, 1978

[30] Foreign Application Priority Data

Mar. 1, 1978 [JP] Japan ................................. 53-22042
Jul. 3, 1978 [JP] Japan ................................. 53-79825
Jul. 3, 1978 [JP] Japan ................................. 53-79826

[51] Int. Cl.$^2$ .......................... C08F 4/02; C08F 10/06
[52] U.S. Cl. ................................. 526/125; 252/429 B; 252/429 C; 526/142; 526/351; 526/906
[58] Field of Search ................................ 526/125, 142

[56] References Cited

U.S. PATENT DOCUMENTS

| | | | |
|---|---|---|---|
| 3,149,098 | 9/1964 | Price et al. | 526/142 |
| 4,069,169 | 1/1978 | Toyota et al. | 526/125 |
| 4,107,414 | 8/1978 | Giannini et al. | 526/125 |

*Primary Examiner*—Edward J. Smith
*Attorney, Agent, or Firm*—J. Harold Nissen

[57] ABSTRACT

Stereospecific polymerization of α-olefins is carried out with use of a catalyst comprising an activated titanium component obtained by treating products of copulverization of magnesium halides and aromatic orthocarboxylic acid esters with titanium halides, an organoaluminum compound and an electron donative compound. α-Olefin polymers of high stereospecificity are thus obtained with a high polymerization activity.

14 Claims, No Drawings

PROCESS FOR POLYMERIZATION OF α-OLEFINS

BACKGROUND OF THE INVENTION

This invention relates to a process for the stereospecific polymerization of α-olefins and a catalyst therefor.

It is well-known and has now been conducted in a commercial scale that α-olefins such as propylene and butene are polymerized in the presence of a so-called Ziegler-Natta catalyst comprising titanium trichloride and an organoaluminum compound to form a stereospecific poly-α-olefin.

Recently, methods supported the titanium component of Ziegler-Natta catalysts on a carrier for improving the catalyst activity have been developed and generally, have being employed for a catalyst for polymerization of ethylene. In case of polymerization of α-olefins such as propylene and butene, a useful, crystalline polymer cannot be obtained unless the polymeric chain has an isotactic structure in which alkyl groups such as methyl or ethyl are stereospecifically regulated. Therefore, catalysts improved only in polymerization activity as the case of polymerization of ethylene cannot be considered to be a useful catalyst for polymerization of α-olefins and thus, regulating a stereospecificity of polymer is significant matters.

In connection with this, there were provided methods including the step of adding an electron donative compound as the third component to a combination of a carrier type titanium component having a titanium compound supported on magnesium halides and an organoaluminum compound thereby improving the stereospecificity of polymer. For example, British Pat. No. 1,387,890 discloses catalysts comprising a titanium halide composition, an organoaluminum compound and an electron donative compound, said titanium halide composition being prepared by pulverizing magnesium halides together with titanium halides or pulverizing a complex of titanium halides and an electron donative compound together with magnesium halides. These catalysts are, however, still insufficient in a polymerization activity and a crystallinity of polymers obtained.

SUMMARY OF THE INVENTION

An object of this invention is to provide a process for the stereospecific polymerization of α-olefins, obtaining polymers of high stereospecificity with a high polymerization activity.

Another object of this invention is to provide a carrier type of the titanium catalyst component, providing a poly-α-olefin with an improved polymerization activity and stereospecificity.

The foregoing and other objects will fundamentally be attained by polymerizing α-olefins in the presence of a catalyst comprising a carrier type titanium component obtained by contact treatment of copulverized products of magnesium halide and an aromatic orthocarboxylic acid ester with titanium halide, an organoaluminum compound and an electron donative compound.

According to another embodiment of this invention, the stereospecific polymerization of α-olefins may be carried out in the presence of a catalyst comprising a carrier type titanium component obtained by contact treatment of copulverized products of magnesium halide, aluminum halide and an aromatic orthocarboxylic acid ester with titanium halide, an organoaluminum compound and an electron donative compound.

According to still another embodiment of this invention, a titanium component obtained by contact treatment of copulverized products of magnesium halide, an aluminum halide-organic acid ester complex and an aromatic orthocarboxylic acid ester with titanium halide may be used for the carrier type titanium component for a polymerization catalyst of α-olefins.

According to further another embodiment of this invention, a titanium component obtained by contact treatment of copulverized products of magnesium halide, aluminum halide, an aromatic orthocarboxylic acid ester and an organosilicon compound having at least one alkoxyl group with titanium halide may be used for the carrier type titanium component for a polymerization catalyst of α-olefins.

DETAILED DESCRIPTION OF THE INVENTION

Magnesium halides which may be used in the preparation of the carrier type titanium component are, preferably, a substantially anhydrous magnesium halide and particularly, magnesium chloride is preferred.

An aromatic orthocarboxylic acid ester which may be used is represented by the formula,

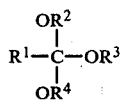

where $R^1$ is an aromatic hydrocarbon radical and each of $R^2$, $R^3$ and $R^4$ which may be the same or different is a hydrocarbon radical. Preferably, derivatives of orthobenzoic acid esters or orthonaphthoic acid esters are used. As for $R^2$, $R^3$ and $R^4$, an aliphatic hydrocarbon radical of 1-10 carbon atoms is preferred. Examples of these compounds include methyl orthobenzoate, ethyl orthobenzoate, methyl orthotoluylate, ethyl orthotolaylate, ethyl orthoanisate and propyl orthoanisate.

This invention is characterized by using aromatic orthocarboxylic acid esters, and with use of an aliphatic orthocarboxylic acid ester the desired effects cannot be attained as shown in the hereinafter mentioned Reference Examples 3 and 6. An amount of the aromatic orthocarboxylic acid ester is not particularly limited, though 0.05–0.3 moles per 1.0 mole of magnesium halide are preferred.

Aluminum halides which may be used in the preparation of the activated titanium catalyst component are, preferably, a substantially anhydrous aluminum halide and particularly, aluminum chloride is preferred. An amount of the aluminum halide is not particularly limited, though 0.5–2.0 moles per 1.0 mole of an aromatic orthocarboxylic acid ester are preferred.

Also, an aluminum halide-organic acid ester complex which may be used in the preparation of the activated titanium catalyst component is obtained in the conventional methods, for example, by mixing aluminum halides with organic acid esters at normal temperature or at elevated temperatures.

The organic acid ester which may be used is an aromatic carboxylic acid ester, an aliphatic carboxylic acid ester and an alicyclic carboxylic acid ester. An aromatic carboxylic acid ester is preferred. Examples include methyl benzoate, ethyl benzoate, methyl toluylate and the like.

An amount of the complex is not particularly limited, though 0.05–0.3 moles per 1.0 mole of magnesium halide are preferred.

Furthermore, an organosilicon compound having at least one alkoxyl group which may be used in the preparation of the activated titanium component may be represented by the formula, $$Si(OR^5)_m X_n Y_p$$

wherein $R^5$ is an alkyl group, each of X and Y is a hydrocarbon radical, halogen or a carbonyloxy group $$R-\underset{\underset{O}{\|}}{C}-O-$$

wherein R is an alkyl group, m is an integer of 1–4, each of n and p is 0–3 and the total of m, n and p is 4. Examples of these compounds include $Si(OC_2H_5)_3Cl$, $Si(OC_2H_5)_2Cl_2$, $Si(OCOCH_3)(OC_2H_5)Cl_2$, $Si(OC_2H_5)_4$, $Si(C_2H_5)_2(OC_2H_5)_2$, $Si(C_6H_5)(OC_2H_5)_3$ and the like. There are particularly preferred those having at least two alkoxyl groups, such as $Si(C_2H_5)(OC_2H_5)_3$, $Si(OC_2H_5)_4$, $Si(C_2H_5)_2(OC_2H_5)_2$ or $Si(C_6H_5)(OC_2H_5)_3$.

An amount of the organosilicon compound is not particularly limited, though 0.05–0.15 moles per 1.0 mole of magnesium halide are preferred.

For the preparation of the activated titanium catalyst component, there is, first, formed a copulverized product of (1) a combination of magnesium halides and an aromatic orthocarboxylic acid ester: (2) a combination of magnesium halides, aluminum halides and an aromatic orthocarboxylic acid ester: (3) a combination of magnesium halides, an aluminum halide-organic acid ester complex and an aromatic orthocarboxylic acid ester: or (4) a combination of magnesium halides, aluminum halides, an aromatic orthocarboxylic acid ester and an organosilicon compound having at least one alkoxyl group.

In this case, a complex of aluminum halides with an aromatic orthocarboxylic acid ester which has been previously synthesized or a reaction product of magnesium halides with an aromatic orthocarboxylic acid ester which has been previously synthesized may be used instead of adding each components separately.

The pulverization process may be conducted under vacuum or atmosphere of an inert gas and should be effected in substantially the absence of oxygen and moisture. The pulverization conditions are not particularly limited, though the temperature is comprised between 0° and 80° C. in general. The pulverization time varies depending on types of pulverizers, but is normally comprised between 2 and 100 hours. Next, the copulverized products thus obtained are subject to contact treatment with titanium halides. Examples of titanium halides which may be used include titanium tetrachloride, titanium tetrabromide and the like. Particularly, titanium tetrachloride is preferred.

The contact treatment may be conveniently, effected by suspending the above copulverized products in the titanium halide or in its solution in an inert solvent, maintaining contact at temperatures of 0°–135° C. and then separating solid materials, followed by drying or removing free titanium halides by washing with an inert solvent to obtain the activated titanium catalyst component. The term of inert solvents used herein means aliphatic, alicyclic or aromatic hydrocarbons and mixtures thereof.

In accordance with this invention, the activated titanium component obtained above is combined with an organoaluminum compound and an electron donative compound to form a catalyst of high activity for polymerization of α-olefins.

The organoaluminum compound which may be used is represented by the formula, $$AlR_m X'_{3-m}$$

wherein R is a hydrocarbon radical, X' is an alkoxyl group, hydrogen or halogen atoms, and m is 1.5 to 3.0. The typical examples include triethylaluminum, tri-n-butylaluminum, tri-iso-butylaluminum, tri-n-hexylaluminum, diethylaluminum monochloride, diethylaluminum hydride, diethylaluminum ethoxide and others. These may be used alone or in mixture. A mole ratio of the organoaluminum compound to titanium metal of the activated titanium component is not limited, though it is within preferably, the range of 1 to 500.

Electron donative compounds which may be used include phosphorus-, oxygen- or nitrogen-containing compounds. The phosphorus-containing compound may be represented by the Formulae, $$P(Z^1)_m(Y^1Z^1)_{3-m}$$

or $$O=P(Z^1)_m(Y^1Z^1)_{3-m}$$

wherein $Z^1$ is hydrogen, a hydrocarbon radical, amino groups or alkylamino groups, $Y^1$ is oxygen or sulphur and m is 0 to 3. The oxygen-containing compound may be represented by the formulae, $$\underset{Z^3}{\overset{Z^2}{\diagdown}}O \qquad \underset{Z^3}{\overset{Z^2}{\diagdown}}C=O$$

or $$Z^2(COOZ^3)_k$$

wherein $Z^2$ and $Z^3$ each are a hydrocarbon radical or together may form a ring and k is 1 to 3.

Examples of the nitrogen-containing compound are amines or derivatives thereof. Preferably, organic acid esters and the aromatic orthocarboxylic acid esters having the abovementioned Formula are used for the electron donative compound. Typical examples of the organic acid ester are methyl formate, ethyl acetate, amyl acetate, methyl acrylate, methyl methacrylate, methyl benzoate, ethyl benzoate, methyl toluylate, methyl anisate and others.

The electron donative compound may be brought into contact with other components at any time during the preparation of a catalyst. The electron donative compound may be also added when polymerization of α-olefins is effected. Generally, there are methods of contacting the electron donative compound after contact of the activated Ti component with the organoaluminum compound, contacting the activated Ti component after contact of the organoaluminum compound with the electron donative compound, contacting the organoaluminum compound after contact of the activated Ti component with the electron donative compound or contacting the three components at the same time. It is, particularly, preferred that a part or all of the electron donative compound to be added is allowed to exist when contacting the activated titanium component with the organoaluminum compound to polymerize polymerizable monomers. An amount of the electron donative compound is within, preferably, the range of 0.1 to 0.5 moles per 1.0 mole of the organoaluminum compound. When the amount exceeds 0.5 moles, it would result in a sudden decrease in polymerization activity without an further increase in stereospecificity.

This invention may be applied to a homopolymerization or copolymerization of α-olefins having the formula, $$R_1-CH=CH_2$$

wherein $R_1$ is an alkyl group of 1-10 carbon atoms, or a copolymerization of the above α-olefin with ethylene. Examples of the α-olefin are propylene, butene-1, hexen-1, 4-methyl-pentene-1 and the like.

The polymerization procedure according to this invention may be carried out in the conventional method using usual conditions. The polymerization temperature is generally in the range of 0°–100° C., preferably 20°–90° C. and the pressure is in the range of from normal pressure to 50 atm., preferably from normal pressure to 40 atm.

In the polymerization reaction, a solvent such as an aliphatic, alicyclic or aromatic hydrocarbon or mixture thereof may be used and may be, for example, propane, butane, pentane, hexane, heptane, cyclohexane, benzene, toluene or mixtures thereof.

Also, a bulk polymerization may be employed using liquid monomers themselves as the solvent. Alternatively, the polymerization reaction may be conducted in the vapour phase wherein gaseous monomers are directly contacted with the catalyst without use of a solvent.

The molecular weight of polymers produced by the method of this invention varies depending on the manner of reaction, kind of catalyst and polymerization conditions. However, the molecular weight may be controlled by adding to the reaction system, for example, hydrogen, an alkyl halide and a dialkyl zinc, if necessary.

This invention will be illustrated by way of the following examples. Also, for the purpose of comparison there are set forth Reference Examples which are beyond the scope of this invention.

EXAMPLE 1

(A) 20.0 g of magnesium chloride and 6 ml of methyl orthobenzoate were charged under nitrogen atmosphere into a vibration mill provided with a pot of 600 ml in inner volume, in which 80 steel balls with a diameter of 12 mm were placed, and subject to pulverization for 20 hours.

10 g of the pulverized products thus obtained and 200 ml of titanium tetrachloride were charged into a 300 ml round-bottomed flask and stirred at 80° C. for two hours and thereafter, the supernatant liquid was removed by decantation. Next, after repeating seven times a washing treatment consisting of the steps of stirring with 200 ml of n-heptane at room temperature for 30 minutes and then removing the supernatant liquid by decantation, further 200 ml of n-heptane were added to obtain an activated titanium component slurry. A part of the activated titanium component slurry was sampled and subjected to analysis after evaporating n-heptane. A titanium content of the activated titanium component was 1.50% by weight.

(B) 1.0 l of n-heptane, 0.1 g of the above activated titanium component, 0.375 ml of triisobutylaluminum, 0.18 ml of diethylaluminum chloride and 0.08 ml of methyl orthobenzoate were charged into a stainless steel autoclave of 3.0 l in capacity under nitrogen atmosphere. After exhausting the nitrogen gas from the autoclave by means of a vacuum pump, gaseous hydrogen was fed till a partial pressure of 0.1 kg/cm$^2$ and then, propylene was fed till a vapour pressure of 2 kg/cm$^2$.Gauge. The autoclave was heated and after 5 minutes, the inner temperature was elevated to 70° C.

While feeding propylene to maintain the pressure at 5 kg/cm$^2$.Gauge, polymerization was continued at 70° C. for one hour.

After cooling the autoclave, unreacted propylene was purged and the contents were removed, filtered and dried at 60° C. under reduced pressure.

Thus 85.4 g of a white powdery polypropylene were obtained.

Limiting viscosity number (135° C., tetralin): 1.98
Bulk density: 0.33 g/ml
Extraction residue of polymer with boiling n-heptane (hereinafter referred to as "Powder II"):92.7%

On the other hand, 4.8 g of polymers soluble in n-heptane were obtained. The ratio of the extraction residue of polymer with boiling n-heptane to the total polymer (hereinafter referred to as "Total II") was 87.8%. A polymerization activity of the catalyst in this Example was 60 kg/g.Ti.hr (Formation rate of polymer per gram of activated Ti per hour).

REFERENCE EXAMPLES 1 AND 2

Using 26.4 g of magnesium chloride and 3.6 g of titanium tetrachloride, a titanium component was prepared by conducting copulverization in the same manner as in Example I (A).

Polymerization was repeated in the same manner as in Example 1 (B) except using 0.2 g of the titanium component obtained above, 0.1 ml of triethylaluminum and ethyl benzoate as the third component. The results are set forth in Table 1.

REFERENCE EXAMPLE 3

In accordance with the procedure of Example 1 (A), a titanium component having a titanium content of 2.5 weight % was obtained by copulverizing 20 g of magnesium chloride and 6 ml of ethyl orthoacetate and then effecting reaction with titanium tetrachloride followed by washing with n-heptane.

Using 0.1 g of the above titanium component, 0.375 ml of triisobutylaluminum, 0.18 ml of diethylaluminum chloride and 0.08 ml of methyl orthobenzoate, polymerization was carried out in the same procedure as in Example 1 (B) for two hours.

However, polypropylene was not obtained at all.

REFERENCE EXAMPLE 4

A titanium component of 3.0 weight % in titanium content was prepared by copulverizing 23.6 g of magnesium chloride and 6.4 g of a titanium tetrachloride-ethyl benzoate complex in accordance with the procedure of Example 1 (A).

Using 0.20 g of the above titanium component and 0.1 ml of triethylaluminum, polymerization was carried out in the same procedure as in Example 1 (B).

After two hours polymerization, 110 g of a powdery polypropylene were obtained.
Powder II: 70.3%
Limiting viscosity number: 1.80
Bulk density: 0.22 g/ml
On the other hand, 30.5 g of non-crystalline polypropylene were obtained from the filtrate.

Total II: 55.0%
Polymerization activity: 11.7 kg/g.Ti.hr
Yield of polymer: 23.4 kg/g.Ti

REFERENCE EXAMPLE 5

In accordance with the procedure of Example 1 (A), a titanium component of 1.21 weight % in titanium content was obtained by copulverizing 24.7 g of magnesium chloride and 5.3 g of ethyl benzoate and then conducting reaction with titanium tetrachloride followed by washing with n-heptane.
Using 0.20 g of the above titanium component and 0.07 ml of triethylaluminum, polymerization was carried out in the same manner as in Example 1 (B) for two hours. 218 g of a powdery polypropylene and 25 g of polypropylene soluble in n-heptane were obtained.
Powder II: 95.0%
Bulk density: 0.28 g/ml
Limiting viscosity number: 1.98
Polymerization activity: 51 kg/g.Ti.hr
Total II: 85.2%

Table 1

| Reference Example No. | Ethyl Benzoate g | Polymerization Time hr. | Powdery Polypropylene Yield g | Non-crystalline Polypropylene Yield g | Activity kg/g.Ti.hr. | Yield kg/g.Ti | Total II % | Limiting Viscosity Number | Bulk Density g/ml |
|---|---|---|---|---|---|---|---|---|---|
| 1 | 0.02 | 2 | 62 | 5 | 5.6 | 11.2 | 83.2 | 1.55 | 0.20 |
| 2 | 0.05 | 2 | 30 | 3 | 2.8 | 5.5 | 82.8 | 1.71 | 0.22 |

EXAMPLE 2

Using the catalyst component obtained in Example 1 (A), polymerization was carried out in the same procedure as in Example 1 (B) except using ethyl benzoate instead of methyl orthobenzoate as the third component to be added at the time of polymerization.
The results are set forth in Table 2.

EXAMPLES 3 TO 6

An activated titanium component was prepared using various aromatic orthocarboxylic acid esters instead of methyl orthobenzoate which had been used for the preparation of the activated titanium component in Example 1 (A).
Using the activated titanium component thus obtained, polymerization of propylene was carried out in the same manner as in Example 1 (B).
The results are set forth in Table 2.

EXAMPLE 7

Using 0.1 g of the activated titanium component obtained in Example 1 (A), 0.1 ml of ethyl benzoate and 0.3 ml of diethylaluminum ethoxide, polymerization was carried out in the same manner as in Example 1 (B).
The results are set forth in Table 2.

Table 2

| Example No. | Activated Ti Component Ortho-esters*1 | Activated Ti Component Ti Content wt.% | Organoaluminum Compounds Type | Organoaluminum Compounds Amount ml | 3rd Component Type | 3rd Component Amount ml | Polymerization Time hr. | Yield g | Activity kg/g Ti·hr | Total II % | Limiting Viscosity Number | Bulk Density g/ml |
|---|---|---|---|---|---|---|---|---|---|---|---|---|
| 2 | Methyl orthobenzoate | 1.50 | Triisobutylaluminum | 0.375 | Ethylbenzoate | 0.14 | 1.0 | 95 | 63 | 89.7 | 1.73 | 0.31 |
| 3 | Ethyl orthobenzoate | 1.34 | Triisobutylaluminum | " | Methyl orthobenzoate | 0.08 | 1.0 | 83 | 62 | 88.7 | 1.68 | 0.33 |
| 4 | Methyl orthotoluylate | 1.33 | Triisobutylaluminum | " | Ethyl benzoate | 0.14 | 1.0 | 78 | 59 | 89.1 | 1.87 | 0.29 |
| 5 | Ethyl orthotoluylate | 1.27 | Diethylaluminum hydride | 0.5 | Ethyl benzoate | " | 1.0 | 70 | 55 | 89.3 | 1.75 | 0.28 |
| 6 | Ethyl orthoanisate | 1.56 | Triisobutylaluminum | 0.8 | Ethyl benzoate | " | 1.0 | 94 | 60 | 88.2 | 2.0 | 0.31 |
| 7 | Methyl orthobenzoate | 1.50 | Diethylaluminum ethoxide | 0.30 | Ethyl benzoate | 0.1 | 1.0 | 98 | 65 | 89.2 | 1.98 | 0.28 |

*1 Aromatic orthocarboxylic acid esters added for the preparation of an activated Ti component.

EXAMPLE 8

(A) A copulverized product was obtained in the same manner as in Example 1 (A) except using 20 g of magnesium chloride, 4.8 g of aluminum chloride and 6 ml of methyl orthobenzoate for copulverization.

10 g of the above pulverized products and 100 ml of titanium tetrachloride were charged into a 200 ml round-bottomed flask and stirred at 80° C. for two hours and then, the supernatant liquid was removed by decantation. Next, after repeating seven times a washing treatment of stirring with 100 ml of n-heptane at 80° C. for 15 minutes and then removing the supernatant liquid by decantation, further 100 ml of n-heptane were added to form an activated titanium component slurry.

A part of the activated titanium component slurry was sampled and subjected to analysis after evaporating n-heptane. A titanium content of the activated titanium component was 2.20 weight %.

(B) Using 50 mg of the above activated titanium component, 0.375 ml of triisobutylaluminum, 0.18 ml of diethylaluminum chloride and 0.08 ml of methyl orthobenzoate, polymerization was carried out in accordance with the procedure of Example 1 (B).

The results are set forth in Table 3.

EXAMPLE 9

An activated titanium component was prepared in the same manner as in Example 8 (A) except using 13.2 g of a methyl orthobenzoate-aluminum chloride complex (1:1) which had been previously synthesized instead of methyl orthobenzoate and aluminum chloride for pulverization. A titanium content of the catalyst component thus obtained was 1.97 weight %.

Polymerization was carried out in the same manner as in Example 1 (B) except using 48 mg of the above catalyst component.

The results are set forth in Table 3.

EXAMPLE 10

An activated titanium component was prepared in the same manner as in Example 8 (A) except using ethyl orthobenzoate instead of methyl orthobenzoate.

Using 62 mg of the above titanium component, polymerization was carried out in the same manner as in Example 1 (B).

The results are set forth in Table 3.

EXAMPLE 11

An activated titanium component was prepared in the same manner as in Example 8 (A) except using 4.8 g of anhydrous aluminum bromide instead of 4.8 g of aluminum chloride for copulverization.

A titanium content of the activated titanium component thus obtained was 2.21 weight %.

Polymerization was carried out in the same manner as in Example 1 (B) except using 50 mg of the above activated titanium component.

The results are set forth in Table 3.

REFERENCE EXAMPLE 6

A catalyst component was synthesized in the same manner as in Example 8 (A) except using 6 ml of methyl orthoacetate instead of methyl orthobenzoate for copulverization.

Polymerization was carried out in the same manner as in Example 1 (B) except using 52 mg of the above catalyst component. Polymers were, however, not obtained at all.

Table 3

| Example No. | Activated Ti Component Ortho-esters | Activated Ti Component Ti Content wt.% | Organoaluminum Compounds Triisobutyl-aluminum ml | Organoaluminum Compounds Diethyl-aluminum chloride ml | Electron Donative Compounds (ml) | Polymerization Time hr. | Yield g | Activity kg/g.Ti.hr | Total II % | Limiting Viscosity Number | Bulk Density g/ml |
|---|---|---|---|---|---|---|---|---|---|---|---|
| 8 | Methyl ortho-benzoate | 2.20 | 0.375 | 0.18 | Methyl orthoben-zoate (0.08) | 1.0 | 238 | 225 | 89.9 | 1.90 | 0.32 |
| 9 | Methyl ortho-benzoate | 1.97 | " | " | Methyl orthoben-zoate (0.08) | 1.0 | 240 | 253 | 90.8 | 1.55 | 0.28 |
| 10 | Ethyl ortho-benzoate | 1.61 | " | " | Methyl orthoben-zoate (0.08) | 1.0 | 245 | 278 | 88.6 | 1.53 | 0.31 |
| 11 | Methyl ortho-benzoate | 2.21 | " | " | Methyl orthoben-zoate (0.08) | 1.0 | 195 | 184 | 88.9 | 1.93 | 0.32 |

EXAMPLE 12

(A) Using 20 g of magnesium chloride, 3.8 g of an aluminum chloride-ethyl benzoate complex (1:1) and 4 ml of methyl orthobenzoate for copulverization, copulverized products were prepared in the same manner as in Example 1 (A).

An activated titanium component was prepared in the same manner as in Example 8 (A) except using 10 g of the above copulverized product. The titanium content was 2.10 weight %.

(B) Using 62 mg of the above activated titanium component, 0.375 ml of triisobutylaluminum, 0.24 ml of diethylaluminum chloride and 0.14 ml of ethyl benzoate, polymerization was carried out in the same manner as in Example 1 (B).

The results are set forth in Table 4.

EXAMPLE 13

Using 20 g of magnesium chloride, 11.9 g of an aluminum chloride-ethyl benzoate complex (1:1) and 1.0 ml of methyl orthobenzoate for copulverization, an activated titanium component was prepared in the same manner as in Example 12. Polymerization was conducted in the same manner as in Example 12 (B) except using 69 mg of the above activated titanium component.

The results are set forth in Table 4.

ethyltriethoxysilane instead of tetraethoxysilane for pulverization.

The titanium content was 2.20 weight %.

Polymerization was carried out in the same manner as

Table 4

| Example No. | Activated Ti Component | | Polymerization Time hr | Yield g | Activity kg/g . Ti . hr | Total II % | Limiting Viscosity Number | Bulk Density g/ml |
|---|---|---|---|---|---|---|---|---|
| | Org. Carboxylic acid ester complex | Aromatic orthoester | | | | | | |
| 12 | Ethyl benzoate/ aluminum chloride complex (3.8 g) | Methyl orthobenzoate (4 ml) | 1.0 | 199.6 | 156 | 94.6 | 1.41 | 0.24 |
| 13 | Ethyl benzoate/ aluminum chloride complex (11.9 g) | Methyl orthobenzoate (1 ml) | " | 224.4 | 153 | 94.1 | 1.51 | 0.24 |

EXAMPLE 14

(A) 20 g of magnesium chloride, 5.6 g of aluminum chloride, 4 ml of methyl orthobenzoate and 2 ml of tetraethoxysilane were charged into the vibration mill used in Example 1 (A) and pulverized for 40 hours. Using 10 g of the above pulverized products, an activated titanium component was prepared in the same manner as in Example 8 (A). The titanium content was 2.23 weight %.

(B) Using 65 mg of the above titanium component, 0.375 ml of triisobutylaluminum, 0.24 ml of diethylaluminum chloride and 0.14 ml of ethyl benzoate, polymerization was carried out in the same manner as in Example 1 (B).

The results are set forth in Table 5.

EXAMPLE 15

Using the activated titanium component obtained in Example 14 (A), polymerization was carried out in the same manner as in Example 14 (B) except using 0.08 ml of methyl orthobenzoate and 0.18 ml of diethylaluminum chloride instead of 0.14 ml of ethyl benzoate and 0.24 ml of diethylaluminum chloride, respectively.

The results are set forth in Table 5.

EXAMPLE 16

An activated titanium component was prepared in the same manner as in Example 14 (A) except using 2 ml of in Example 14 (B) except using 58 mg of the above activated titanium component.

The results are set forth in Table 5.

EXAMPLE 17

An activated titanium component was prepared in the same manner as in Example 14 (A) except using 4.0 ml of ethyl orthobenzoate instead of methyl orthobenzoate for pulverization.

Using 62 mg of the above titanium component, polymerization was carried out in the same manner as in Example 14 (B).

The results are set forth in Table 5.

EXAMPLE 18

An activated titanium component was prepared in the same manner as in Example 14 (A) except using 2 ml of methyl orthobenzoate and 6 ml of tetraethoxysilane for pulverization. The titanium content was 3.2 weight %.

Polymerization was carried out in the same manner as in Example 14 (B) except using 61 mg of the above titanium component.

The results are set forth in Table 5.

EXAMPLE 19

Using the titanium component obtained in Example 14 (A), polymerization was carried out in the same manner as in Example 14 (B) except using 0.25 ml of ethyl benzoate.

The results are set forth in Table 5.

Table 5

| Ex. No. | Activated Ti Component | | Organoaluminum Compounds | | Electron Donative Compounds (ml) | Polymerization Time hr | Yield g | Activity kg/g . Ti . hr | Total II % | Limiting Viscosity Number | Bulk Density g/ml |
|---|---|---|---|---|---|---|---|---|---|---|---|
| | Ortho- esters (ml) | Organic Silanes (ml) | Triisobutyl- aluminum ml | Diethyl- aluminum chloride ml | | | | | | | |
| 14 | Methyl ortho- benzoate (4.0) | Tetra- ethoxy- silane (2.0) | 0.375 | 0.24 | Ethyl benzoate (0.14) | 1.0 | 160 | 113 | 94.4 | 1.53 | 0.33 |
| 15 | Methyl ortho- Benzoate (4.0) | Tetra- ethoxy- silane (2.0) | " | 0.18 | Methyl ortho- benzoate (0.08) | 1.0 | 182 | 128 | 94.0 | 1.68 | 0.34 |
| 16 | Methyl ortho- benozate (4.0) | Ethyl- trieth- oxysilane (2.0) | " | 0.24 | Ethyl benzoate (0.14) | " | 220 | 178 | 94.3 | 1.41 | 0.28 |
| 17 | Ethyl ortho- benzoate (4.0) | Tetra- ethoxy- silane (2.0) | " | " | Ethyl benzoate (0.14) | " | 201 | 134 | 93.1 | 1.55 | 0.25 |

Table 5-continued

| Ex. No. | Activated Ti Component | | Organoaluminum Compounds | | Electron Donative Compounds (ml) | Polymerization Time hr | Yield g | Activity kg/g·Ti·hr | Total II % | Limiting Viscosity Number | Bulk Density g/ml |
|---|---|---|---|---|---|---|---|---|---|---|---|
| | Ortho-esters (ml) | Organic Silanes (ml) | Triisobutyl-aluminum ml | Diethyl-aluminum chloride ml | | | | | | | |
| 18 | Methyl ortho-benzoate (2.0) | Tetra-ethoxy-silane (6.0) | " | " | Ethyl benzoate (0.14) | " | 165 | 85 | 94.2 | 1.48 | 0.35 |
| 19 | Methyl ortho-benzoate (4.0) | Tetra-ethoxy-silane (1.0) | " | " | Ethyl benzoate (0.25) | " | 95 | 69 | 93.8 | 1.48 | 0.30 |

REFERENCE EXAMPLE 7

An titanium component of 3.48 weight % in titanium content was prepared in the same manner as in Example 8 by copulverizing 20 g of magnesium chloride and 6 ml of tetraethoxysilane and effecting reaction with titanium tetrachloride followed by washing with n-heptane.

Using 58 mg of the above titanium component, 0.20 ml of ethyl benzoate and 0.5 ml of triethylaluminum, polymerization was carried out in the same manner as in Example 8 (B) for one hour.

69 g of a powdery polypropylene and 2.1 g of polypropylene soluble in n-heptane were obtained.
Powder II: 95.8%
Bulk density: 0.30 g/ml
Limiting viscosity number: 1.89
Activity: 35 kg/g.Ti.hr
Total II: 93.0%

What is claimed is:

1. In a process for the stereospecific polymerization of α-olefins with use of a catalyst comprising a titanium compound supported on a carrier, an organoaluminum compound and an electron donative compound, the improvement which comprises using an activated titanium compound obtained by contact treatment of magnesium halide and an aromatic orthocarboxylic acid ester with titanium halide as the titanium compound supported on a carrier.

2. The process of claim 1 wherein said aromatic orthocarboxylic acid ester is represented by the formula, $$R^1-\underset{\underset{OR^4}{|}}{\overset{\overset{OR^2}{|}}{C}}-OR^3$$

wherein $R^1$ is an aromatic hydrocarbon radical and each of $R^2$, $R^3$ and $R^4$ which may be the same or different is a hydrocarbon radical.

3. The process of claim 1 wherein said magnesium halide is magnesium chloride.

4. In a process for the stereospecific polymerization of α-olefins with use of a catalyst comprising a titanium compound supported on a carrier, an organoaluminum compound and an electron donative compound, the improvement which comprises using an activated titanium compound obtained by contact treatment of magnesium halide, an aromatic orthocarboxylic acid ester and an aluminum halide with a titanium halide as said titanium compound supported on a carrier.

5. The process of claim 4 wherein said aromatic orthocarboxylic acid ester is represented by the formula, $$R^1-\underset{\underset{OR^4}{|}}{\overset{\overset{OR^2}{|}}{C}}-OR^3$$

wherein $R^1$ is an aromatic hydrocarbon radical and each of $R^2$, $R^3$ and $R^4$ which may be the same or different is a hydrocarbon radical.

6. The process of claim 4 wherein said magnesium halide is magnesium chloride and said aluminum halide is aluminum chloride.

7. In a process for the stereospecific polymerization of α-olefins with use of a catalyst comprising a titanium compound supported on a carrier, an organoaluminum compound and an electron donative compound, the improvement which comprises using an activated titanium compound obtained by contact treatment of magnesium halide, an aromatic orthocarboxylic acid ester and an aluminum halide-organic acid ester complex with a titanium halide as said titanium compound supported on a carrier.

8. The process of claim 7 wherein said aromatic orthocarboxylic acid ester is represented by the formula, $$R^1-\underset{\underset{OR^4}{|}}{\overset{\overset{OR^2}{|}}{C}}-OR^3$$

wherein $R^1$ is an aromatic hydrocarbon radical and each of $R^2$, $R^3$ and $R^4$ which may be the same or different is a hydrocarbon radical.

9. The process of claim 7 wherein said magnesium halide is magnesium chloride and said aluminum halide is aluminum chloride.

10. The process of claim 7 wherein said aluminum halide-organic acid ester complex is an aluminum halide-aromatic carboxylic acid ester complex.

11. In a process for the stereospecific polymerization of α-olefins with use of a catalyst comprising a titanium compound supported on a carrier, an organoaluminum compound and an electron donative compound, the improvement which comprises using an activated titanium compound obtained by contact treatment of a magnesium halide, an aromatic orthocarboxylic acid ester, an aluminum halide and an organanosilicon compound having at least one alkoxyl group with a titanium halide as said titanium compound supported on a carrier.

12. The process of claim 11 wherein said aromatic orthocarboxylic acid ester is represented by the formula,

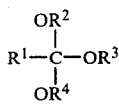

wherein $R^1$ is an aromatic hydrocarbon radical and each of $R^2$, $R^3$ and $R^4$ which may be the same or different is a hydrocarbon radical.

13. The process of claim 11 wherein said magnesium halide is magnesium chloride and said aluminum halide is aluminum chloride.

14. The process of claim 11 wherein said organosilicon compound is represented by the formula, $$Si(OR^5)_m X_n Y_p$$

wherein $R^5$ is an alkyl group, each of X and Y is a hydrocarbon radical, halogen or a carbonyloxy group

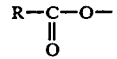

wherein R is an alkyl group, m is an integer of 1 to 4, each of n and p is 0–3 and the total of m, n and p is 4.

* * * * *